(12) United States Patent  
Nakaota (10) Patent No.: US 7,986,425 B2  
(45) Date of Patent: Jul. 26, 2011

(54) IMAGE FORMING APPARATUS WITH DEPARTMENT MANAGEMENT FUNCTION, NETWORK PRINTER WITH DEPARTMENT MANAGEMENT FUNCTION, DEPARTMENT MANAGEMENT METHOD OF IMAGE FORMING APPARATUS AND DEPARTMENT MANAGEMENT METHOD OF NETWORK PRINTER

(75) Inventor: Hiroyuki Nakaota, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1196 days.

(21) Appl. No.: 11/674,825

(22) Filed: Feb. 14, 2007

(65) Prior Publication Data

US 2008/0192282 A1    Aug. 14, 2008

(51) Int. Cl.
*G06F 3/12* (2006.01)
*G06K 15/00* (2006.01)
*H04N 1/00* (2006.01)
*G03G 21/02* (2006.01)

(52) U.S. Cl. ......... 358/1.15; 358/1.14; 358/440; 399/79
(58) Field of Classification Search ................... 358/1.1, 358/440, 1.15, 1.13, 1.14, 403, 501; 399/79
See application file for complete search history.

(56) References Cited

U.S. PATENT DOCUMENTS

2007/0002370 A1* 1/2007 Shibata ................. 358/1.15
2007/0288550 A1* 12/2007 Ise et al. ................. 709/203

FOREIGN PATENT DOCUMENTS

| JP | 2002-063008 | 2/2002 |
| JP | 2002-236577 | 8/2002 |
| JP | 2002-361980 | 12/2002 |
| JP | 2004-326271 | 11/2004 |

* cited by examiner

*Primary Examiner* — Thomas J Lett
(74) *Attorney, Agent, or Firm* — Turocy & Watson, LLP (57) ABSTRACT

The invention relates to an image forming apparatus with a department management function connected to computers provided in plural departments, respectively, via a network. The image forming apparatus has a communication interface with external apparatuses to which addresses different from one another notified for the respective computers of the plural departments are allocated, respectively. When, from the computer of each of the departments, a print job including an address notified to the department and print data is transmitted via the network, the image forming apparatus receives this print job with the communication interface. The image forming apparatus discriminates a department that has transmitted this print job according to a correspondence relation with the addresses allocated to the communication interface, performs counting by department, and causes the printing unit to execute printing.

16 Claims, 5 Drawing Sheets

| DEPARTMENT NAME | CORRESPONDING IPv6 ADDRESS | ABBREVIATED DESCRIPTION OF IPv6 ADDRESS |
|---|---|---|
| NO DEPARTMENT | fe80:0000:0000:0000:0000:0000:0000:0001 | fe80::0001 |
| DEPARTMENT X | fe80:0000:0000:0000:0000:0000:0000:0002 | fe80::0002 |
| DEPARTMENT Y | fe80:0000:0000:0000:0000:0000:0000:0003 | fe80::0003 |
| DEPARTMENT Z | fe80:0000:0000:0000:0000:0000:0000:0004 | fe80::0004 |
| : | : | : |
| : | : | : |

Fig.8

| DEPARTMENT NAME | CORRESPONDING IPv6 ADDRESS | HOST NAME |
|---|---|---|
| NO DEPARTMENT | fe80:0000:0000:0000:0000:0000:0000:0001 | Prn_other |
| DEPARTMENT X | fe80:0000:0000:0000:0000:0000:0000:0002 | Prndep_x |
| DEPARTMENT Y | fe80:0000:0000:0000:0000:0000:0000:0003 | Prndep_y |
| DEPARTMENT Z | fe80:0000:0000:0000:0000:0000:0000:0004 | Prndep_z |
| : | : | : |
| : | : | : |

IMAGE FORMING APPARATUS WITH DEPARTMENT MANAGEMENT FUNCTION, NETWORK PRINTER WITH DEPARTMENT MANAGEMENT FUNCTION, DEPARTMENT MANAGEMENT METHOD OF IMAGE FORMING APPARATUS AND DEPARTMENT MANAGEMENT METHOD OF NETWORK PRINTER

BACKGROUND OF THE INVENTION

1. Field of the Invention

The present invention relates to an image forming apparatus with a department management function for managing print jobs from respective departments by department and performing printing, a network printer with a department management function employing this image forming apparatus, a department management method of the image forming apparatus, and a department management method of the network printer.

2. Description of the Related Art

In recent years, a printing system in which at least one image forming apparatus and computers provided for each plurality of departments are connected by a network is used. In this printing system, department management for, for example, receiving print requests from the respective departments in the image forming apparatus via the network, performing printing, and counting the number of prints by department is performed. By performing such department management, accounting, guidance for limitation of the number of prints, and guidance for saving of expenses are performed and unregistered departments are prevented from illegally using the system.

As a conventional method of department management, as described in JP-A-2002-236577, a method of managing the number of prints and the like according to department IDs is proposed.

Since such an image forming apparatus is used as a so-called network printer, the image forming apparatus has a communication interface with external apparatuses connected to the network. One IP address is allocated to this communication interface. When departmental printing is performed, department codes corresponding to the respective departments are set on the image forming apparatus (hereinafter referred to as network printer) side by an administrator. The administrator notifies a user of an IP address of the network printer and a department ID.

The user installs a printer driver dedicated to the network printer in a computer (hereinafter, PC) in a department of the user. In this case, the user inputs the IP address of the network printer notified from the administrator. The user opens a user interface of the printer driver before printing and also inputs the department ID notified from the administrator. After this, the user can sends a print request to the network printer and perform the departmental printing via the network.

Printer drivers dedicated to the computers in the respective departments are installed because a normal general-purpose driver does not have a function of inputting department IDs and it is impossible to input the department IDs. As described above, conventionally, since the department IDs have to be inputted to the computers in the respective departments, the special-purpose printer drivers imparted with the function of inputting the department IDs have to be installed.

When the network printer receives a print job from the user, the network printer determines a department, which has transmitted the print job, according to the department ID received as a part of information on the print job and performs printing. It is possible to perform the departmental printing according to the setting of the department ID by the administrator and the user.

In such a system, the user needs the IP address of the network printer, the special-purpose printer driver, and the department code of the network printer in order to perform the departmental printing of the network printer. As a result, the system is complicated.

When the departmental printing is performed in the network printer, on the user interface of the special-purpose printer driver, the user has to input the department code to be used. However, it is likely that the user forgets to input the department code or erases the department code by initializing setting of the printer driver. In other words, it is likely that a situation occurs in which printing cannot be performed because of an operation mistake of the user.

DETAILED DESCRIPTION OF THE INVENTION

An embodiment of the invention will be explained in detail with the drawings as examples.

Figure 1:
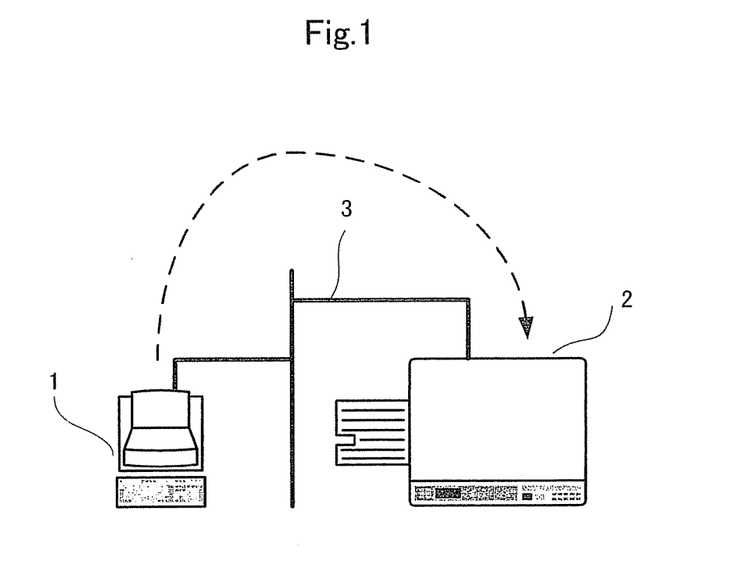
FIG. 1 is a schematic diagram showing a relation with a department according to a first embodiment of the invention.

FIG. 1 is a schematically shows a relation between a computer (hereinafter, user PC) 1 provided in each of plural departments and an image forming apparatus (hereinafter, network printer) 2 connectable to the user PC 1 in each of these department via a network 3. In this embodiment, so-called departmental printing for printing, with the network printer 2, a print job sent from the user PC 1 in each of the departments through the network 3 is performed. As an example, a case is considered in which department management (department count) for plural departments (no department, a department X, a department Y, and a department Z) is performed in a network environment to which a base protocol of the IPv6 (Internet Protocol Version 6) is applied.

The IPv6 is a next-generation version of a communication protocol forming a base of the Internet. An IP protocol used to date is called IPv4, in which a 32-bit number is used for an IP address. On the other hand, in the IPv6, a 128-bit number is used for an IP address.

Figure 2:
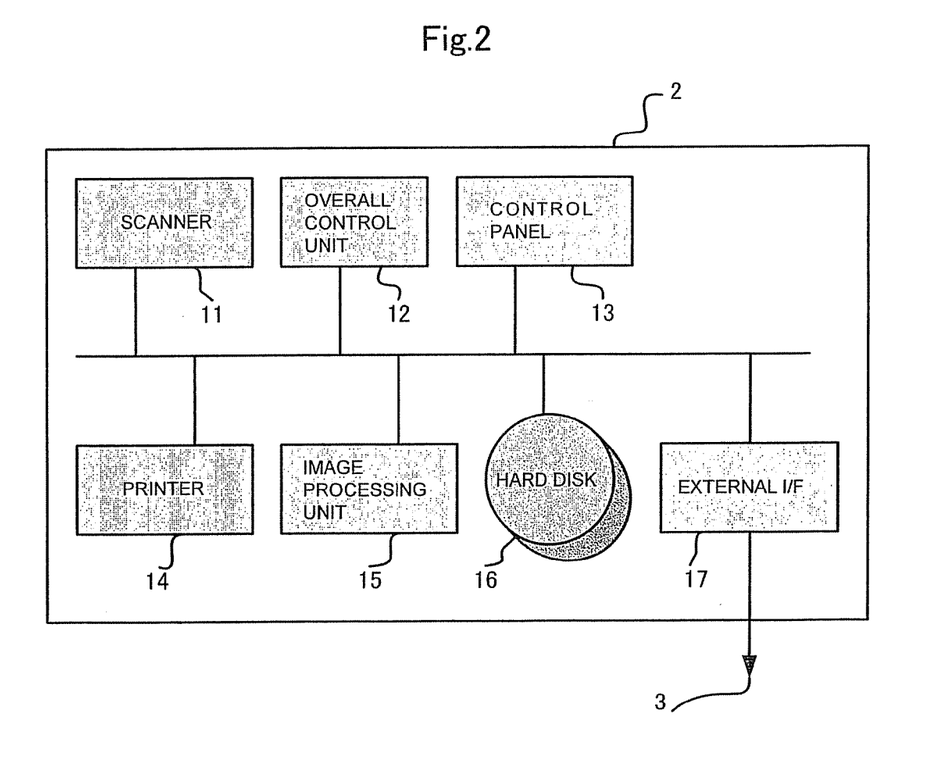
FIG. 2 is a block diagram showing an internal structure of a network printer according to a first embodiment of the invention.

FIG. 2 shows an internal structure of the network printer 2. Reference numeral 11 denotes an image scanning unit, which has a scanner function for directly scanning an original and the like not through the network 3. Reference numeral 12 denotes a control unit including a CPU, a ROM, and a RAM, which are not shown in the figure. The control unit comprehensively controls respective units in the network printer 2 and controls department count and the like described later. Reference numeral 13 denotes a control panel, on which a switch for inputting various commands to the network printer 2, a display device for state display, and the like are provided. Reference numeral 14 denotes a printing unit, which executes predetermined printing in accordance with print data. Reference numeral 15 denotes an image processing unit, which performs processing for enabling printing such as expansion of print data into a bit map. Reference numeral 16 denotes a hard disk, which stores a department table and various setting items described later. Reference numeral 17 denotes a communication interface with external apparatuses, which is configured to be connectable to the user PC 1 in each of the departments shown in FIG. 1 via the network 3. These units are connected to one another by an internal bus.

The administrator sets IP addresses corresponding to the respective departments on the network printer 2 side. Since the IPv6 is applied as the network environment as described above, the administrator sets IPv6 addresses different from one another for each of the departments as shown in a data table in FIG. 7.

The IPv6 addresses for the respective departments are set in a department table of the hard disk 16 by the control unit 12 in FIG. 2. The respective IPv6 addresses are allocated to the communication interface 17. In other words, the administrator allocates plural IPv6 addresses to one network interface card (NIC) of the network printer 2 using an IP alias function. Each of the IPv6 addresses functions as a reception box for each of the department.

It is possible to also use the IP alias function in the IPv4, which is widely used at present, if a function is added. However, since it is unpractical to use, for one apparatus, plural addresses among a limited number of addresses of the IPv4, this is not performed at present. In the IPv6, since it is possible to use an enormous address space, it is possible to use plural addresses for one apparatus.

Figure 3:
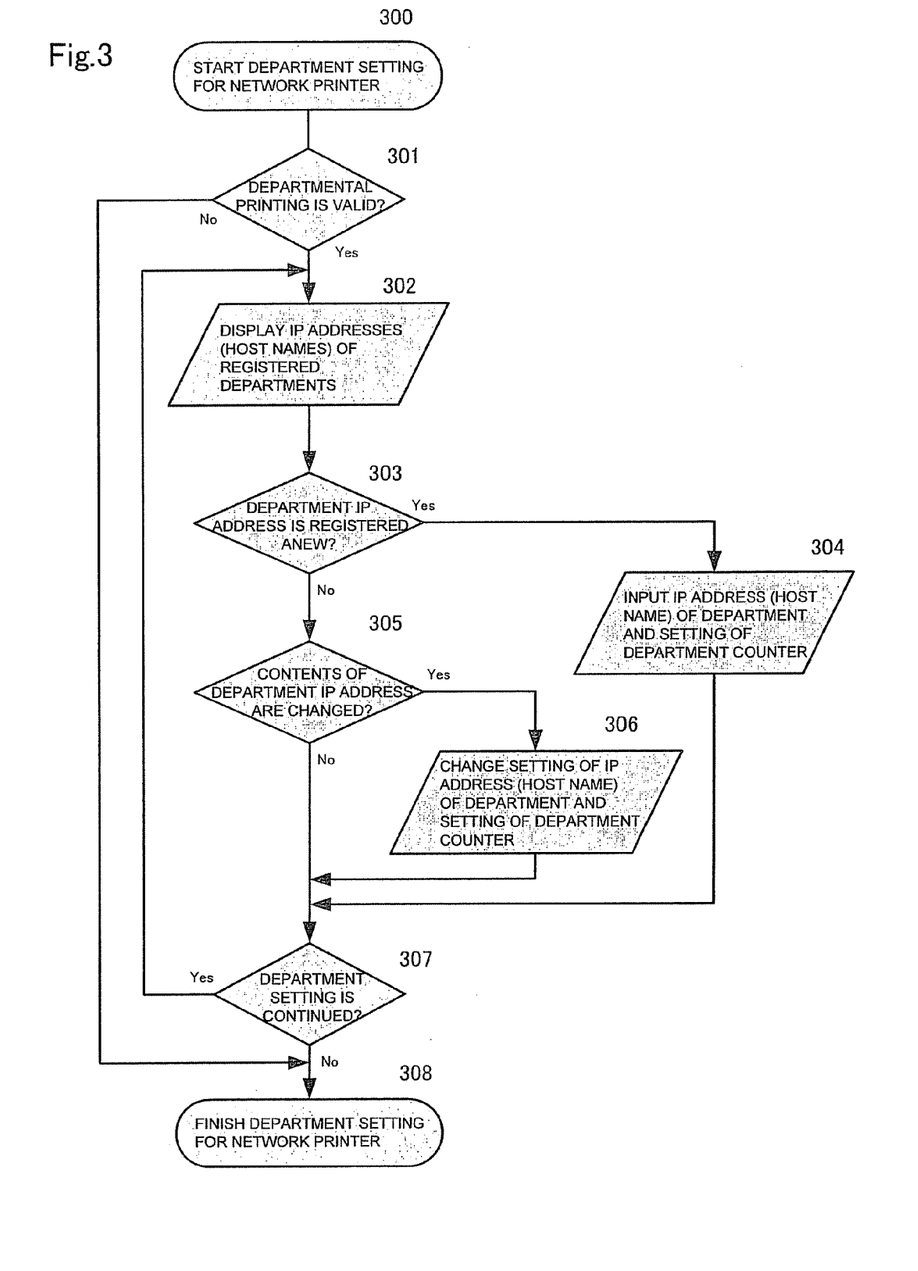
FIG. 3 is a flowchart for explaining a flow of department setting on the network printer side according to the first embodiment of the invention.
Figure 7:
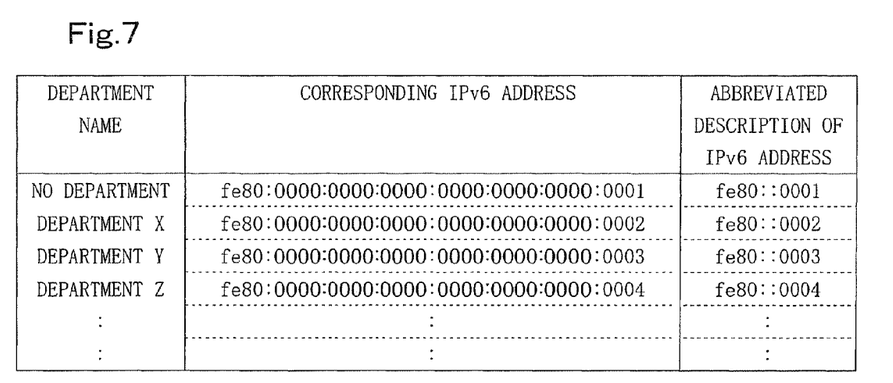
FIG. 7 is a table showing a relation between departments and IPv6 addresses according to the first embodiment of the invention.

FIG. 3 explains a procedure with which the administrator sets IPv6 addresses corresponding to the respective departments on the network printer 2 side. When department setting for the network printer 2 is started (step 300), first, the administrator validates department management (departmental printing) (step 301). The administrator causes the network printer 2 to display IP addresses corresponding to registered departments as shown in FIG. 7 (actually, departments in the left space shown in the figure and abbreviated descriptions of the IPv6 addresses in the right space shown in the figure) (step 302). With reference to the registered departments, the administrator performs allocation of the IPv6 addresses and setting of department counters and the like for the respective department.

When the administrator performs new registration (step 303: Yes), the administrator performs allocation of an IPv6 address and setting of a new department counter for a new department (step 304). When the administrator does not perform new registration (step 303: No) and changes the IP addresses of the registered departments (step 305: Yes), the administrator performs change of the allocation of the IPv6 addresses and change of the setting of the department counters (step 306). When the allocation of the IPv6 addresses and the setting of the department counters and the like for all the departments are finished in this way (step 307: No), the administrator finishes the department setting for the network printer 2 (step 308).

The IPv6 addresses allocated to the respective departments in this way are notified to the respective departments by the administrator. For example, when a department of a user is X, an IPv6 address "fe80::0002" (hereinafter, all addresses are described in abbreviation) is notified to the user from the administrator. The user in each of the departments sets the IPv6 address "fe80::0002" notified from the administrator in the user PC 1 in the own department according to a procedure shown in FIG. 4.

Figure 4:
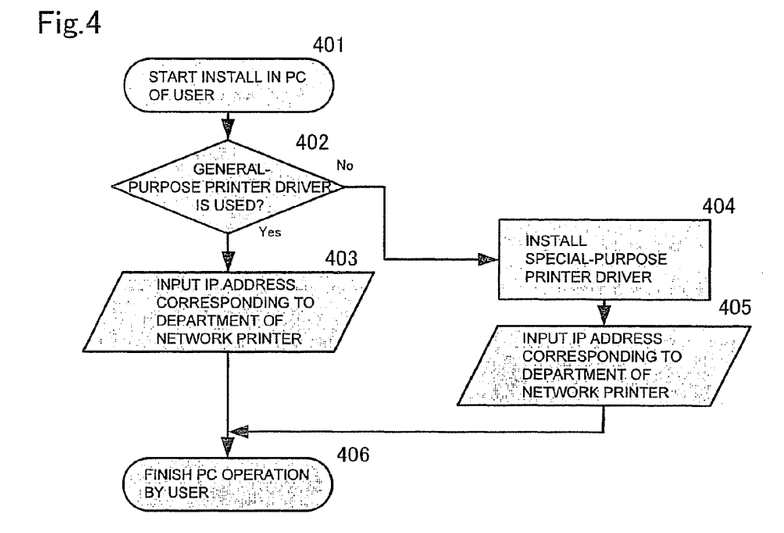
FIG. 4 is a flowchart for explaining a flow for installing a driver of the network printer in a user side PC according to the first embodiment of the invention.

In FIG. 4, the user starts work for installing a printer driver of the network printer 2 in the user PC 1 (step 401). When a general-purpose printer driver has already been installed and the user uses the general-purpose printer driver (step 402: Yes), the user changes setting of an IP address to the IPv6 address "fe80::0002" of the X department (step 403). When the user does not use the general-purpose printer driver (step 402: No), the user installs a special-purpose printer driver in the user PC 1 (step 404) and inputs the IPv6 address "fe80::0002" of the X department that the user uses (step 405). When the operation (step 403 or 405) is finished, all the kinds of operation for the user PC 1 are finished (step 406) and the network printer 2 comes into a printable state.

Conventionally, since it is necessary to set a department ID in a user PC and a general-purpose driver does not have a function of setting a department ID as described above, it is impossible to use the general-purpose driver. However, in the invention, since it is unnecessary to set a department ID, it is possible to use the general-purpose driver. If the general-purpose driver has already been installed in the user PC 1, the general-purpose driver may be used. Only setting of the IP address has to be set to the IPv6 address "fe80::0002" of the X department that the user uses.

In such a constitution, on the user PC 1 side, when printing is performed in the network printer 2, the user can perform the departmental printing without performing any setting. Conventionally, when the departmental printing by a network printer is performed in a user PC, it is necessary to open a user interface of a printer driver and execute printing after inputting a department ID on this user interface. On the other hand, in the invention, the user can perform the departmental printing on the network printer 2 if the user performs print operation on the user PC 1 without being required to perform any setting operation because it is unnecessary to input a department ID.

Figure 5:
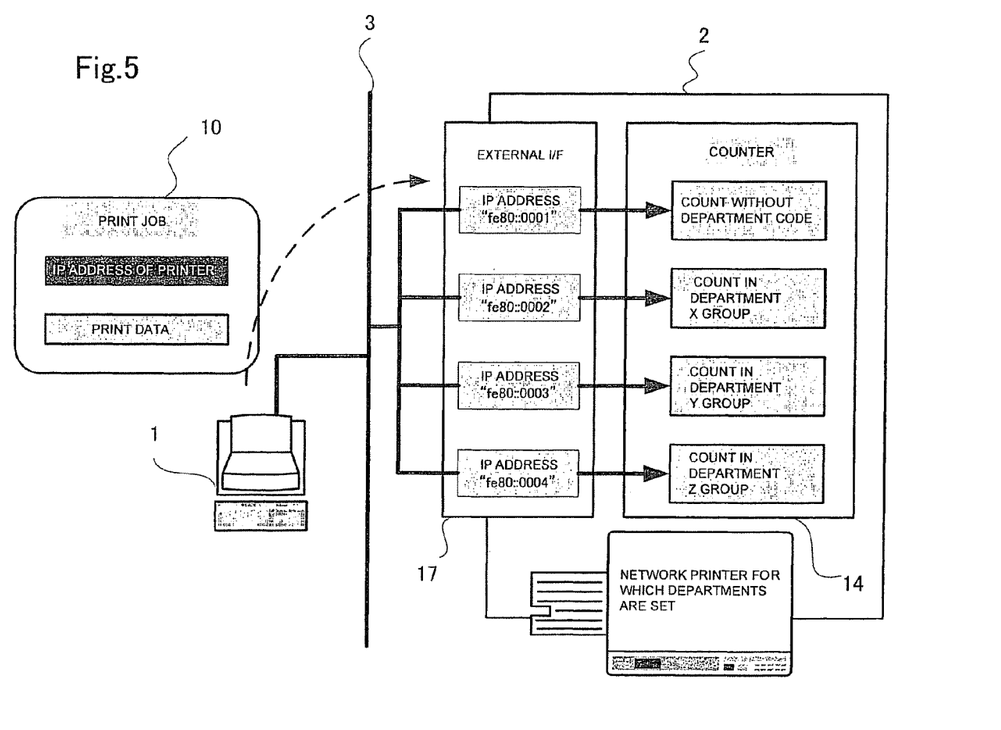
FIG. 5 is a block diagram for explaining a flow of a print job according to the first embodiment of the invention.

FIG. 5 explains a flow of a print job in the departmental printing. In FIG. 5, for example, when the user performs print operation in the user PC 1 in the department X, a print job 10 is sent from this PC 1 to the network printer 2 through the network 3. The IPv6 address "fe80::0002" of the network printer 2 set in the printer driver of the user PC 1 is given to the print job 10 together with print data.

The print job 10 sent from the user PC 1 to the network printer 2 is received by the communication interface 17 with external apparatuses. Since IPv6 addresses "fe80::0001", "fe80::0002", "fe80::0003", and "fe80::0004" for the respective departments are allocated to the communication interface 17, the network printer 2 determines that the department, which has sent the print job 10, is X from a correspondence relation with the IPv6 address "fe80::0002" given to the print job 10 received on the network printer 2 side. As a result, the network printer 2 counts the print counter of the control unit 12 in FIG. 2 in department X and performs the departmental printing, for example, executes printing in the printing unit 14 in accordance with the print data.

The operations described above are explained in a flowchart in FIG. 6. When department determination processing is started in the control unit 12 of the network printer 2 (step 601), the control unit 12 determines in which IP address the job 10 is received (step 602).

Figure 6:
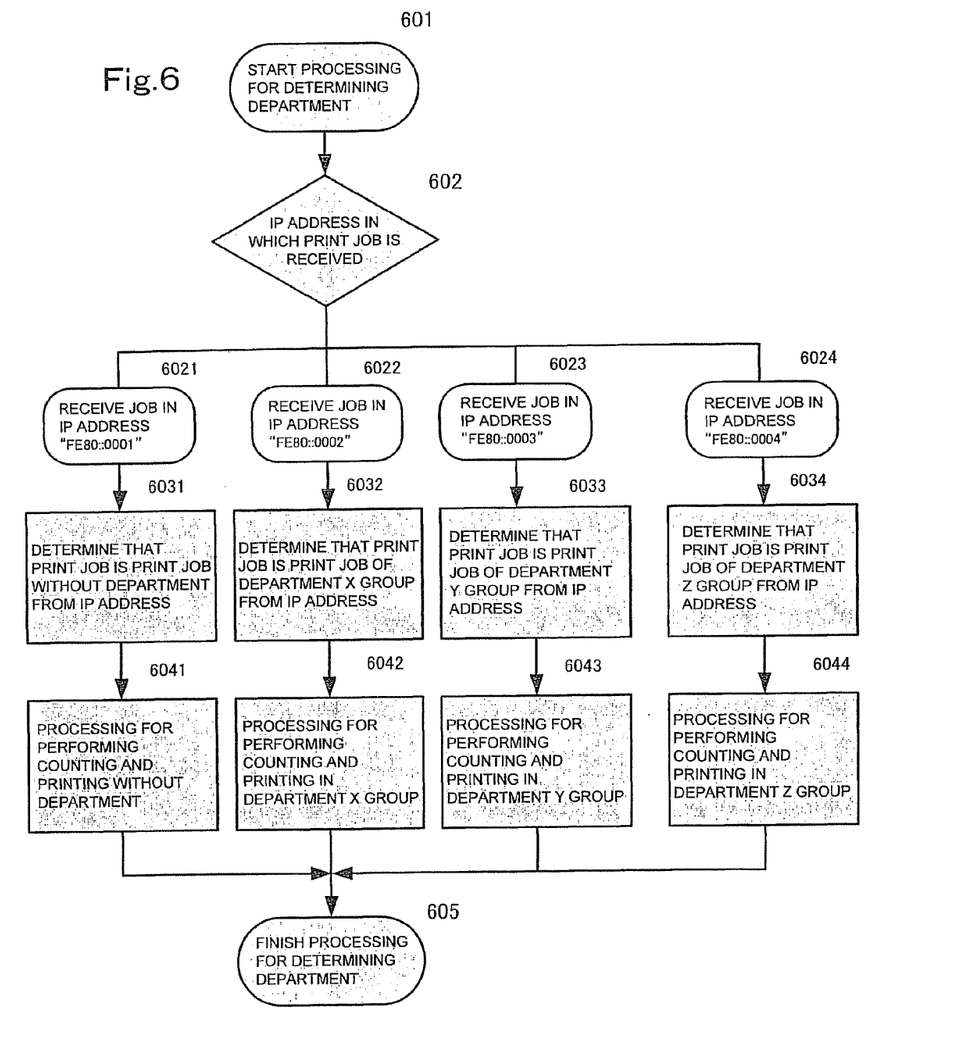
FIG. 6 is a flowchart for explaining a flow of determination of a department by the network printer according to the first embodiment of the invention.

Since the IPv6 addresses "fe80::0001", "fe80::0002", "fe80::0003", and "fe80::0004" for the respective departments are allocated to the communication interface 17 as described above, the control unit 12 determines in which IPv6 address the print job 10 is received. As a result, when the print job 10 is received in the IPv6 address "fe80::0001" (step 6021), the control unit 12 proceeds to steps 6031 and 6041. When the print job 10 is received in the IPv6 address "fe80::0002" (step 6022), the control unit 12 proceeds to steps 6032 and 6042. When the print job 10 is received in the IPv6 address "fe80::0003" (step 6023), the control unit 12 proceeds to steps 6033 and 6043. When the print job 10 is received in the IPv6 address "fe80::0004" (step 6024), the control unit 12 proceeds to steps 6034 and 6044. In the example described above, since the IPv6 address "fe80::0002" of the department X is given to the print job 10, the print job 10 is received in the IPv6 address "fe80::0002" allocated to the communication interface 17 (step 6022). Therefore, the control unit 12 proceeds to step 6032 and determines from this IPv6 address "fe80::0002" that the print job 10 is a print job of the department X. Moreover, the control unit 12 proceeds to step 6042 and performs counting and printing in the department X (step 6042). When these operations end, the control unit 12 finishes the processing for determining a department (step 605).

As described above, in this embodiment, on the network printer 2 side, the plural IPv6 addresses different from one another are set for the respective departments and notified to the respective departments to cause the departments to set the IPv6 addresses in the printer driver of the network printer. Thus, it is possible to omit the input of a department ID conventionally required in the departmental printing. In other words, whereas a printing department is conventionally determined from a department ID received as a part of information on a print job, in this embodiment, a department that has sent a print job is determined from an IPv6 address received. Therefore, on the side of each of the departments, printing operation only has to be performed by the user PC 1. On the network printer 2 side, it is possible to discriminate a printing department from the IPv6 address and perform the departmental printing processing such as print count.

Since input of a department ID is unnecessary, it is possible to use a general-purpose driver as a printer driver of the network printer 2 installed in the user PC 1. Therefore, it is unnecessary to install a special-purpose driver as in the past.

An IP address is one of methods of designating an apparatus on a network. Host names may be used as addresses allocated to the interface 17 with respect to the respective departments. In steps 304 and 306 in FIG. 3, host names may be set anew instead of the IPv6 addresses as IP addresses of the departments or the host names may be changed. A relation between the plural departments and host names corresponding thereto is shown in FIG. 8.

Figure 8:
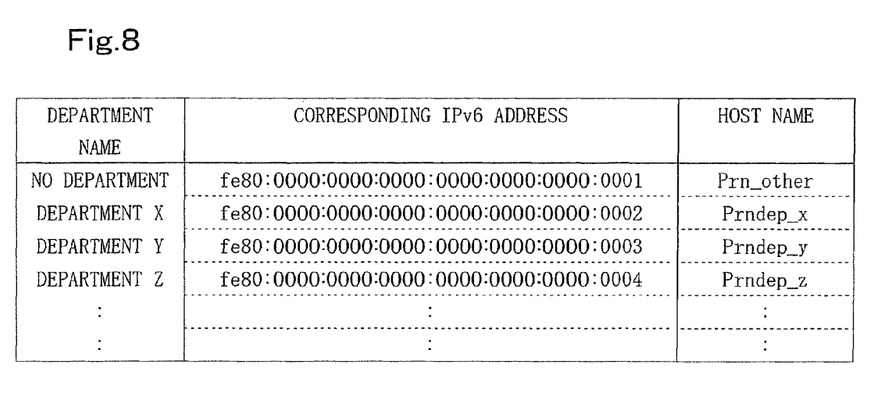
FIG. 8 is a table showing a relation between the departments and host names according to the first embodiment of the invention.

In FIG. 8, IPv6 addresses in the center space are described in order to indicate a correspondence relation with FIG. 7. Actually, a table in FIG. 8 is formed by department names in the left space and host names in the right space shown in the figure.

When the host names are associated with the respective departments in this way, as in the case described above, in order to perform department setting for the network printer 2, as described in FIG. 3, the administrator causes the network printer 2 to display registered departments and host names corresponding thereto as shown in FIG. 8 (step 302). With reference to the registered departments, the administrator performs allocation of a host name to and setting of a department counter and the like in each of the departments.

When the administrator performs new registration (step 303: Yes), the administrator performs allocation of a new host name to and setting of a new department counter in a new department (step 304). When the administrator does not perform new registration (step 303: No) and changes host names of the registered departments (step 305: Yes), the administrator performs change of allocation of the host names and change of setting of the department counters (step 306). When the allocation of host names and the setting of department counters and the like are finished for all the departments in this way (step 307: No), the administrator finishes the department setting for the network printer 2 (step 308).

The host names allocated to the respective departments are notified to the respective departments by the administrator. For example, when a department of a user is X, a host name Prndep_x is notified to the user from the administrator. A user of each of the departments sets the host name notified from the administrator in the user PC 1 in the department of the user. As in the case of the IPv6 address, the user inputs and sets the host name Prndep_x notified to the own department (X) in the printer driver of the network printer 2 installed in the user PC 1 in the procedure explained with reference to FIG. 4.

In such a constitution, on the user PC 1 side, it is possible to perform the departmental printing without performing any setting when printing is performed in the network printer 2. In other words, since input of a department ID is unnecessary, it is possible to perform the departmental printing on the network printer 2 if the user performs print operation on the user PC 1 without being required to perform any setting operation.

A flow of a print job in the departmental printing is the same as that in FIGS. 5 and 6 explained for the case in which the IPv6 addresses are used. The IPv6 addresses in FIGS. 5 and 6 only have to be read as host names. For example, when the user performs print operation in the user PC 1 in the department X, the print job 10 is sent from this PC 1 to the network printer 2 through the network 3. The host name Prndep_x set in the printer driver of the user PC 1 is given to the print job 10 together with print data.

Host names Prn_other, Prndep_x, Prndep_y, and Prndep_z for the respective departments are allocated to the communication interface 17 with external apparatuses in which the print job 10 is received. Thus, from a correspondence relation with the host name Prndep_x given to the print job 10, the network printer 2 determines that a department that has transmitted this print job 10 is X. As a result, the network printer 2 counts the print counter in the department X and performs the departmental printing, for example, executes printing in accordance with print data.

As described above, in this embodiment, on the network printer 2 side, the plural host names different from one another are set for the respective departments and notified to the respective departments to cause the departments to set the host names in the printer driver of the network printer. Thus, in this embodiment, it is possible to omit the input of a department code conventionally required in the departmental printing. Therefore, on the side of each of the departments, printing operation only has to be performed by the user PC 1. On the network printer 2 side, it is possible to discriminate a printing department from the host name and perform the departmental printing processing such as print count.

In the embodiment described above, the setting by IPv6 addresses and host names is explained. However, it is also possible to use NetBIOS names or the like that are name resolution for other networks.

What is claimed is:

1. An image forming apparatus with a department management function, comprising:
   a printing unit configured to print in accordance with a print job;
   a communication interface connected to a first computer belonging to a first department and a second computer belonging to a second department via a network;
   a storage unit configured to store a first IP address for the first department and a second IP address for the second department, both of the first and second IP addresses are used to receive a first print job from the first computer and a second print job belonging to a second department via the network, respectively; and
   a control unit configured to count the number of the first print job based on the number of print jobs received from the first computer with the first IP address and count the number of the second print job based on the number of print jobs received from the second computer with the second IP address.

2. An image forming apparatus with a department management function according to claim 1, wherein an IPv6 is applied as a base protocol of data communication through the network and IPv6 addresses are used as the first IP address and the second IP address.

3. An image forming apparatus with a department management function according to claim 1, wherein first host name is used as the first IP address and second host name is used as the second IP address.

4. An image forming apparatus with a department management function according to claim 1, wherein first NetBIOS name is used as the first IP address and second NetBIOS name is used as the second IP address.

5. A network printer system with a department management function, comprising:
   a first computer belongs to a first department and is connected to a network, has printer drivers, in which a first IP address for the first department is set, and transmits print job including the first IP address to the network;
   a second computer that belongs to a second department and is connected to a network, has a printer driver in which a second IP address for the second department is set, and transmit print job including the second IP address to the network;
   a communication interface connected to the first computer belonging to the first department and the second computer belonging to the second department via the network;
   a storage unit configured to store the first IP address for the first department and the second IP address for the second department, both of the first and second IP addresses are used to receive the first print job from the first computer and the second print job from the second computer via the network, respectively;
   a control unit configured to count the number of the first print job based on the number of print job received from the first computer with the first IP address and count the number of the second print job based on the number of print jobs received from the second computer with the second IP address; and
   a printing unit configured to print in accordance with the print job.

6. A network printer system with a department management function according to claim 5, wherein an IPv6 is applied as a base protocol of data communication through the network and IPv6 addresses are used as the first IP address and the second IP address.

7. A network printer system with a department management function according to claim 5, wherein first host name is used as the first IP address and second host name is used as the second IP address.

8. A network printer system with a department management function according to claim 5, wherein first NetBIOS name is used as the first IP address and second NetBIOS name is used as the second IP address.

9. A department management method of an image forming apparatus, comprising the steps of:
   receiving from a first computer belonging to a first department a first print job including first IP address for the first department or from a second computer belonging to a second department a second print job including second IP address for the second department is transmitted via the network, this first print job or second print job with a communication interface that is connected to the network;
   discriminating a department that has transmitted this print job according to a correspondence relation between the IP address of the first print job or second print job received by the communication interface and the first and second IP addresses stored to a storage;
   counting the number of the first print job based on the number of print job received from the first computer with the first IP address and the number of the second print job based on the number of print job received from the second computer with the second IP address; and
   causing the printing unit to execute printing based on the print job.

10. A department management method of an image forming apparatus according to claim 9, wherein an IPv6 is applied as a base protocol of data communication through the network and IPv6 addresses are used as the first IP address and the second IP address.

11. A department management method of an image forming apparatus according to claim 9, wherein first host name is used as the first IP address and second host name is used as the second IP address.

12. A department management method of an image forming apparatus according to claim 9, wherein first NetBIOS name is used as the first IP address and second NetBIOS name is used as the second IP address.

13. A department management method of a network printer system, comprising the steps of:
   transmitting a first print job including a first IP address for the first department or a second print job including a second IP address for the second department, from a first computer belonging to a second department or a second computer belonging to a second department to the network in order to request printing;
   receiving a first print job including the first IP address or a second print job including the second IP address is transmitted from the first computer or a second computer via the network, this first print job or second print job with a communication interface that is connected to the network;
   discriminating a department that has transmitted this print job according to a correspondence relation between the IP address of the first print job or second print job received by the communication interface and the first and second IP addresses stored to a storage;

counting the number of the first print job based on the number of print jobs received from the first computer with the first IP address and the number of the second print job based on the number of print jobs received from the second computer with the second IP address; and causing the network printing system to execute printing based on the print job.

14. A department management method of a network printer system according to claim 13, wherein an IPv6 is applied as a base protocol of data communication through the network and IPv6 addresses are used as the first IP address and the second IP address.

15. A department management method of a network printer system according to claim 13, wherein first host names is used as the first IP address and second host name is used as the second IP address.

16. A department management method of a network printer system according to claim 13, wherein first NetBIOS name is used as the first IP address and second NetBIOS name is used as the second IP address.

* * * * *